April 26, 1966   W. H. FRAZEL   3,247,918
BELT FEEDER

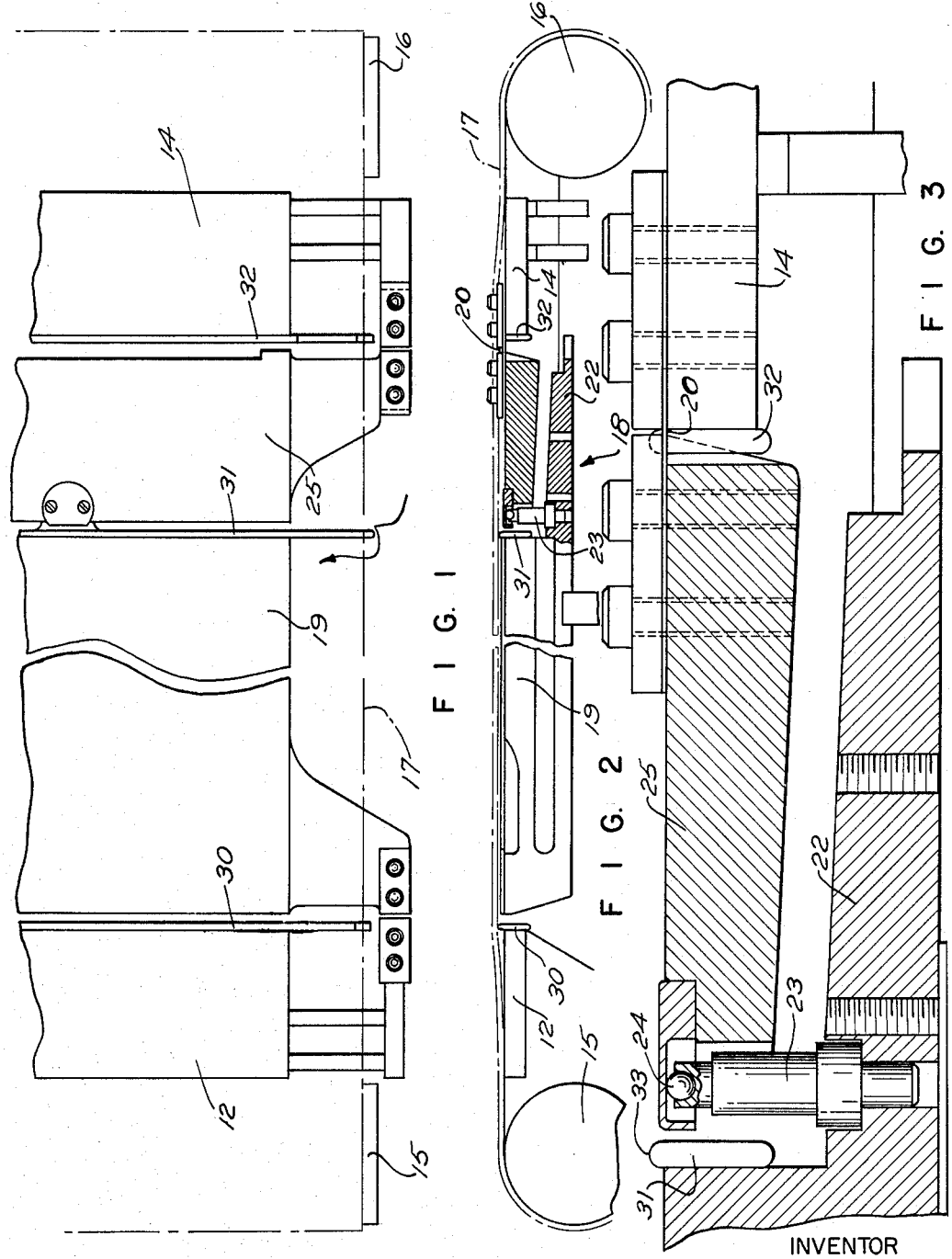

Filed Jan. 8, 1964   2 Sheets-Sheet 2

INVENTOR.
WILBUR H. FRAZEL
BY
Barlow & Barlow
ATTORNEYS

United States Patent Office 3,247,918
Patented Apr. 26, 1966

3,247,918
BELT FEEDER
Wilbur H. Frazel, Riverside, R.I., assignor to The New York Air Brake Company, a corporation of New Jersey
Filed Jan. 8, 1964, Ser. No. 336,411
5 Claims. (Cl. 177—161)

This invention relates to a belt type gravimetric feeder, and more particularly to a means to increase the accuracy of the weigh section.

In a belt type feeder and particularly in one which employs a drag bed for the support of the loaded belt, it is necessary that the bed and belt be exactly flat if the load is to be distributed truly to the bed. This is particularly important at the portion of the bed in which the weigh platform is inserted where it is necessary that the weight distribution be true, so that the weight sensing device will be accurate. From a practical standpoint, it is almost impossible to have perfect flatness of a bed over which the belt is passed and further it is virtually impossible to have a belt which itself is perfectly flat and free from bumps, hollows, wrinkles and other deformations.

This invention provides a means in conjunction with a weight responsive section of a belt type feeder which will improve accuracy at the weigh section by defining weight sensing sections and in particular the limits thereof by providing a transverse line contact support of the belt at the ends of the weigh sections.

In the drawings, FIG. 1 is a partial top plan view with parts broken away showing a belt feeder constructed in accordance with the invention;

FIG. 2 is a sectional view of the belt feeder of FIG. 1;

FIG. 3 is an enlarged sectional view showing a portion of the support means adjacent the weigh section;

Figure 4:
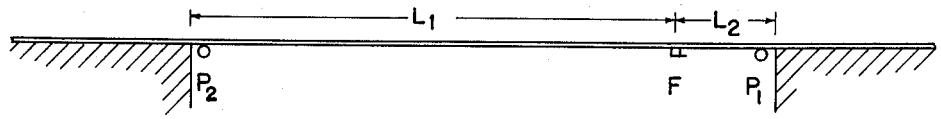
FIGS. 4, 5, 6 and 7 are diagrammatic views illustrating the principle of operation of the invention according to the embodiment of FIGS. 1 to 3.

Referring now in detail to the drawings, there is illustrated in FIGS. 1 to 3 one form in which a belt weigher may be manufactured. In its simplified form it consists of a frame, not shown, upon which is mounted a pair of stationary platforms 12 and 14 together with a pair of rollers 15 and 16 over which the conveyor belt 17 operates and which guide the belt to the weighing section generally designated 18, which is shown as comprising a main weighing platform 19 pivoted to the stationary platform 12 by leaf spring flexures 20, two of such flexures being used, one at each side of platform 12. In the illustrated form, a secondary weighing platform 25 is provided which is pivoted to the stationary platform 14 in a similar manner. To support platform 25, platform 19 carries an extension finger portion at 22. Extending upwardly from the finger portion 22 is a post 23 which has ball engagement as at 24 with the underside of the secondary weighing platform 25. With this arrangement, it will be appreciated that the load that is carried by the weighing platform 25 will be transferred to the platform 19 through the post 23, and that a suitable scale mechanism such as a load cell, not shown, may be affixed to the platform 19 at the extension 22 to transmit the load carried by the weighing platforms to an indicating mechanism of suitable character such as is ordinarily provided for such devices which is of course not shown in the drawings as the particular structure thereof is not part of this invention.

In order to define the weighing portion of the feeder, there is provided a belt support means at specific locations across the width of the weighing platforms in the form of transverse support plates which are raised above the planar bed surface of the weighing platforms. Specifically, in the embodiment shown three such plates are utilized, a first plate 30 being affixed to the stationary platform 12, a second plate 31 affixed to the weighing platform 19 at the end thereof adjacent the platform 25, and a third plate 32 being affixed to the stationary platform 14 adjacent the platform 25. Each of these plates is provided with an arcuate upper edge such as at 33 (FIG. 3) and is positioned with respect to the surface of the platforms so that it will extend above the planar surface of the platforms a finite distance. In one embodiment of the invention, it was found that if the plates extended above the planar surface of the platforms $\frac{1}{16}$ of an inch, satisfactory operation was achieved. With due regard to the weight of the material which is being weighed, the thickness of the belt and other dimensional considerations, the essential requirements, that of defining the weighing sections of the feeder is achieved if the top of the plates extend a sufficient distance to provide a definitive line support transverse of the belt; that is, raise the belt above the surface of the platforms.

The use of the transverse supports is particularly advantageous for empty belt (weight of belt itself only) and light loadings on the belt. With imperfect contact of the belt with the platforms, as loading increases, the weight of the load ultimately presses the belt down against the platforms. Once the belt is touching the platforms at all points, all additional increments of load will be properly weighed; however, those increments of load which are applied before the belt is pressed down completely (in other words, the increments which are required to press the belt down) will not be correctly weighed. The transverse supports permit the correct weighing ol light loads and the setting of an accurate zero.

To understand how the supports 30, 31 and 32 provide the necessary transverse line contact with the belt 17, reference should now be made to FIGS. 4, 5, 6 and 7 of the drawings in which, for example, is shown a belt feeder having a main platform with a length $L_1$ and a secondary platform with a length $L_2$ and with uniform loading on the belt of w. lb./in.

FIG. 4 shows the ideal condition of a perfect belt in perfect contact with both platforms. With $L_1$ equal to 15" and $L_2$ equal to 3" the following shows the force calculations.

Load on 3" platform=3 w.
Force at $P_1$=3 w./2.
Force at $F$=3 w./2.
Load on 15" platform=15 w.
Force at $P_2$=15 w./2.
Force at $F$=15 w./2.
Total force at $F$=9 w.

Figure 5:
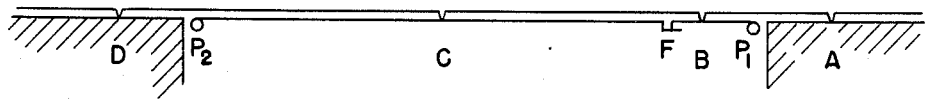

FIG. 5 shows the usual condition in which the contact between the belt and the platforms is not perfect due to irregularities in the belt causing spot or ridge contacts such as at A, B, C and D and with the belt stiff enough to support the load between these spots.

Distance:
  $D-P_2=2''$.
  $P_2-C=8''$.
  $C-F=7''$.
  $F-B=1''$.
  $B-P_1=2''$.
  $P_1-A=2''$.
Load between $A$ and $B$=4 w.
  Force at $B$=2 w.
Load between $B$ and $C$=8 w.
  Force at $B$=4 w.
  Force at $C$=4 w.

Load between $C$ and $D = 10$ w.
  Force at $C = 5$ w.
Total force at $B = 6$ w.
Total force at $C = 9$ w.
Force at $F$ due to 6 w. force at $B = 6$ w. $(2/15) = 4$ w.
Force at $F$ due to 9 w. force at $C = 9$ w. $(8/15) = 72$ w./15.
Total force at $F = 4$ w. $+ 72$ w./15 $= 8.8$ w., which is not 9 w., as it should be.

Figure 6:
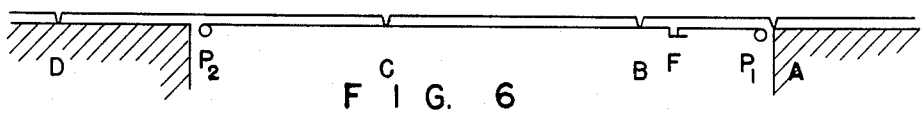

FIG. 6 is the same as FIG. 5 except with the belt moved 2" to the left.

Distance:
  $D - P_2 = 4"$.
  $P_2 - C = 8"$.
  $C - B = 6"$.
  $B - F = 1"$.
  $F - P_1 = 3"$.
Load between $A$ and $B = 4$ w.
  Force at $B = 2$ w.
Load between $B$ and $C = 8$ w.
  Force at $B = 4$ w.
  Force at $C = 4$ w.
Load between $C$ and $D = 10$ w.
  Force at $C = 5$ w.
Total force at $B = 6$ w.
Total force at $C = 9$ w.
Force at $F$ due to 6 w. force at $B = 6$ w. $(14/15) = 84$ w./15.
Force at $F$ due to 9 w. force at $C = 9$ w. $(6/15) = 54$ w./15.
Total force at $F = 138$ w./15 $= 9.2$ w., which is not 9 w., as it should be.

Figure 7:
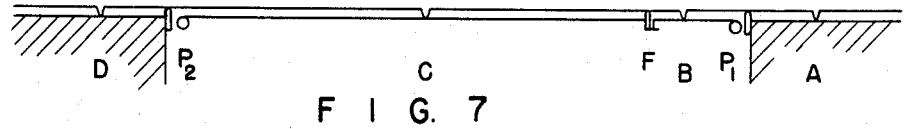

FIG. 7 shows the same feeder and belt as in FIG. 5 but with the transverse supports of my invention located at $F$, $P_1$, and $P_2$.

Distance:
  $D - P_2 = 2"$.
  $P_2 - C = 8"$.
  $C - F = 7"$.
  $F - B = 1"$.
  $B - P_1 = 2"$.
  $P_1 - A = 2"$.
Force on weighting platforms from load between $A$ and $P_1 = 0$.
Load between $P_2$ and $D = 0$.
Load between $P_1$ and $B = 2$ w.
  Force at $B = 1$ w.
Load between $B$ and $F = 1$ w.
  Force at $B = w./2$.
  Force at $F = w./2$.
Load between $F$ and $C = 7$ w.
  Force at $F = 7$ w./2.
  Force at $C = 7$ w./2.
Load between $C$ and $P_2 = 8$ w.
  Force at $C = 4$ w.
Total force at $B = 3$ w./2.
Direct force at $F = 4$ w.
Total force at $C = 15$ w./2.
Force at $F$ due to 3 w./2 at $B = 3$ w./2 $(2/3) = 1$ w.
Force at $F$ due to 15 w./2 at $C = 15$ w./2 $(8/15) = 4$ w.
Total force at $F = 9$ w.

The analysis of FIG. 7 can be followed for any other positions of the contact points A, B, C and D in relation to the platforms and the resulting total force at F will always be 9 w.

The analysis of FIG. 7 can be extended to an extreme case where the belt does not touch the platforms at all but only the transverse supports; the resulting total force at F will still be 9 w.

Figure 8:
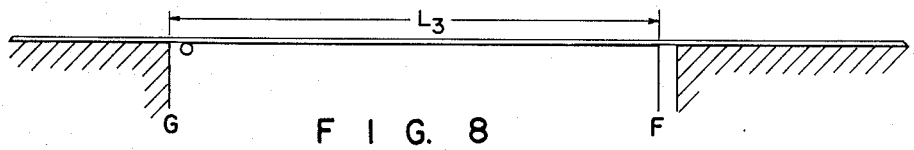
FIGS. 8, 9, and 10 are diagrammatic views illustrating the principle of operation of the invention as appiled to another form.

It has thus been very well demonstrated that by use of the line contact belt support devices that accurately define the weigh platforms, complete accuracy of weighing is provided. It will further be obvious that the illustrated double pivoted platform structure is not necessary to the analysis presented above. Accordingly with the use of these transverse line contact support means, raised slightly above the level of the weighing platforms, any type of weigh span system may be accurately defined and errors due to irregularities in the belt prevented. For example, in FIG. 8, there is shown diagrammatically a belt feeder having a single main platform with a length $L_3$ which shall equal 15 inches and with a uniform loading on the belt of w. lb./in. Assuming as we did in the case of FIG. 4 the ideal condition of a perfect belt in perfect contact with the single platform, it will be readily apparent that the force exerted at F will be 7½ w.

Figure 9:
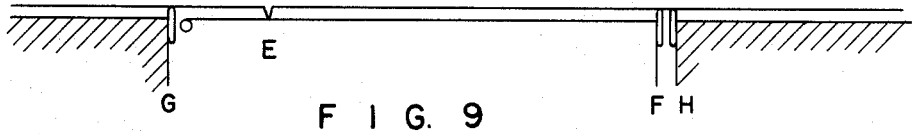

Referring now to FIG. 9 there is shown a condition in which the contact between the belt and the platform is not perfect due to irregularities in the belt, such as at E. Assuming that the belt is sufficiently stiff to support the load between E and the stationary platform on either end of the weighing platform and further assuming that there are no transverse support means used, the following conditions will attain:

Distance:
  $G - E = 3"$.
  $E - F = 12"$.
Load between $E$ and $G = 3$ w.
  Force at $E = 1½$ w.
Load between $E$ and $H = 12$ w.
  Force at $E = 6$ w.
Total force at $E = 7½$ w.

Force at $F$ due to 7½ w. force at $E = 7½$ w. $(3/15) = 1½$ w., which is not 7½ w., as it should be. However, by using the transverse support means as shown, the following conditions will be present:

Load between $E$ and $G = 3$ w.
  Force at $E = 1½$ w.
Load between $E$ and $F = 12$ w.
  Force at $E = 6$ w.
  Force at $F = 6$ w.
Total force at $E = 7½$ w.
Force at $F$ due to 7½ w. force at $E = 7½$ w. $(3/15) = 1½$ w.
Total force at $F = 1½$ w. $+ 6$ w. $= 7½$ w.

Figure 10:
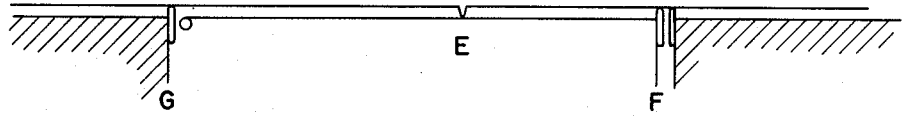

FIG. 10 is the same as FIG. 9, with the irregularity spot E moved to the right 6 inches.

Distance:
  $G - E = 9"$.
  $E - F = 6"$.
Load between $E$ and $G = 9$ w.
  Force at $E = 4½$ w.
Load between $E$ and $F = 6$ w.
  Force at $E = 3$ w.
  Force at $F = 3$ w.
Force at $F$ due to 7½ w. force at $E = 7½$ w. $(3/5) = 4½$ w.
Total force at $F = 4½ + 3$ w. $= 7½$ w.

I claim:
1. In a drag bed feeder having a generally flat planar bed surface, a belt lying on said bed surface, means driving and guiding the belt over said bed surface, said bed surface including a movable weigh platform, and transverse line contact surfaces extending above the flat planar bed surface adjacent the ends of the weigh platform.

2. In a drag bed feeder as in claim 1 including weight transmitting means wherein the weigh platform is pivoted at one end and the weight transmitting means is located adjacent the other end of the weigh platform, one line contact support being physically attached to said other end.

3. In a drag bed feeder as in claim 1, wherein the transverse line contact support means is a vertical plate extending transversely above the planar bed surface.

4. In a drag bed feeder as in claim 1 wherein the weigh platform comprises two portions, each portion being pivoted to the planar bed and being commonly supported at a common joint therebetween, said transverse line contact supports being located adjacent each pivot joint and at the location of the common joint.

5. In a drag bed feeder having a travelling belt, a stationary platform having a planar bed on which a belt is adapted to travel, a weigh platform having a planar bed pivoted to the end of the stationary platform, means providing a transverse line contact above the planar bed of the weigh platform at the end of the stationary platform adjacent the weigh platform and a second transverse line contact above the planar bed of the weigh platform adjacent the other end of the weigh platform, said belt being supported by the bed and said line contacts.

References Cited by the Examiner
UNITED STATES PATENTS

| | | | |
|---|---|---|---|
| 1,032,183 | 7/1912 | Buchan | 177—16 X |
| 1,174,337 | 3/1916 | Messiter | 177—16 |
| 1,619,123 | 3/1927 | Hem | 177—16 |
| 2,664,286 | 12/1953 | Frazel | 177—16 |

LEO SMILOW, *Primary Examiner.*

LEYLAND M. MARTIN, S. J. TOMSKY, *Examiners.*